George W. Hungerford
Machine for Polishing & Enameling Coffee

No. 119,148.    Patented Sep. 19, 1871.

Witness:
Wm H Lotz
G Lotz

Inventor
George W Hungerford

UNITED STATES PATENT OFFICE.

GEORGE WHITNEY HUNGERFORD, OF CHICAGO, ILLINOIS.

IMPROVEMENT IN PROCESSES FOR POLISHING COFFEE.

Specification forming part of Letters Patent No. 119,148, dated September 19, 1871.

*To all whom it may concern:*

Be it known that I, GEORGE WHITNEY HUNGERFORD, of Chicago, in the county of Cook and State of Illinois, have invented certain Improvements in Machines for Polishing and Enameling Coffee, of which the following is a specification, reference being had to the accompanying drawing.

My invention relates to a process for cleaning and enameling coffee-beans; and consists in the employment of a horizontal rotating cylinder or drum with perforated ends, having its interior lined with cloth and provided with blades, the coffee being placed in the cylinder and tumbled until all adhering particles are removed and have escaped through the perforated ends of the cylinder, and then gum arabic introduced, and the coffee again tumbled until the gum has formed a coating thereon.

Figure 1:
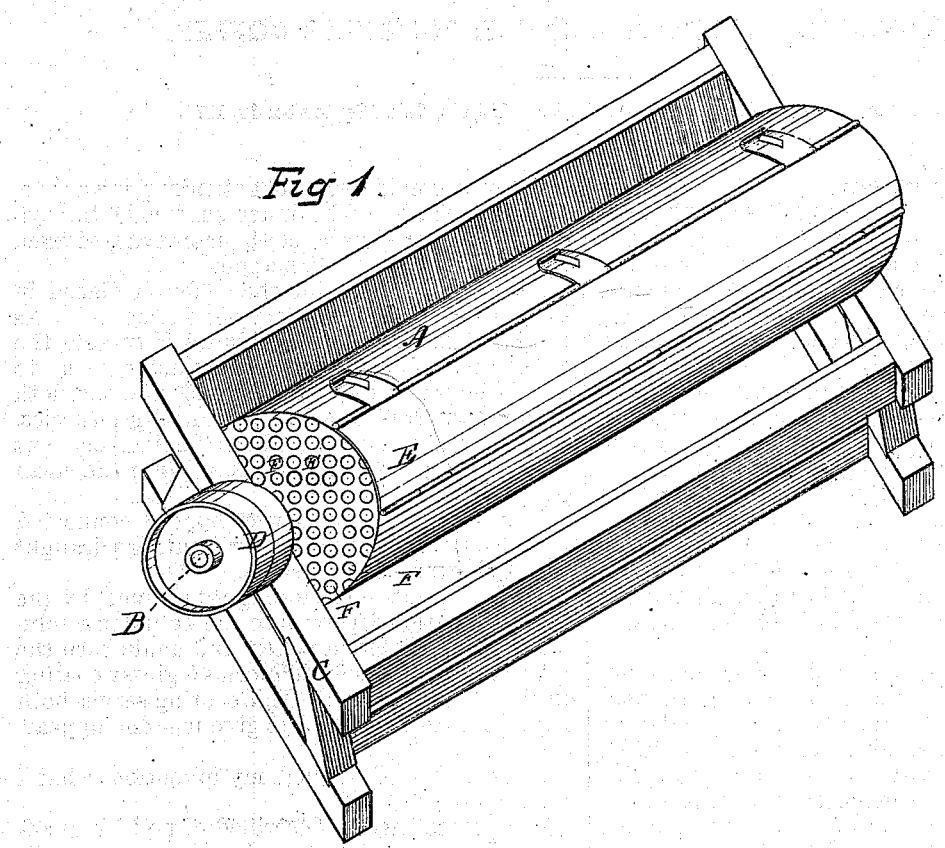
Figure 2:
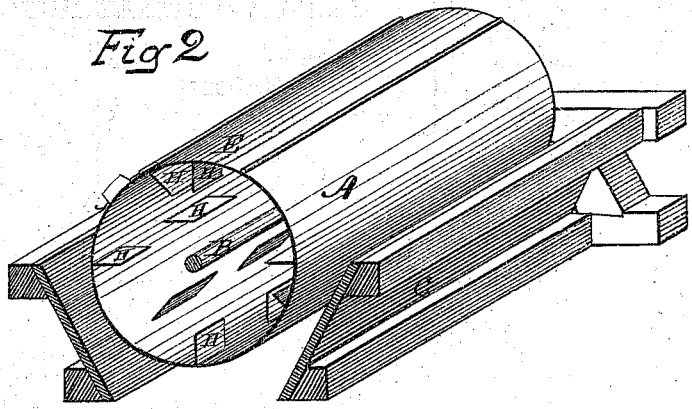

Figure 1 is a perspective view of the machine, and Fig. 2 a perspective of the same in section.

In the drawing, A represents a cylinder, of metal or other material, secured on a shaft, B, which passes longitudinally through the cylinder, and has its ends mounted in bearings on a strong frame, C, as shown. D D are pulleys mounted on the end of shaft B to receive a belt for turning the cylinder. E is a door in the side of the cylinder through which to introduce and remove the contents, and F F are perforations in the ends of the cylinder, of less size than the coffee-beans, for the escape of dirt and impurities. H H are flat blades secured to the inner walls of the cylinder and extending inward toward the center. The inner surface of the cylinder is covered with cloth or canvas, secured thereto in any suitable manner.

In using the machine the coffee is placed in the cylinder and the latter set in motion. As the cylinder revolves the blades H tumble the coffee violently about in the cylinder, so as to grind the grains against each other and the cloth lining, and thus detach all adhering particles. The dirt and impurities, when removed, pass out through the perforated ends, leaving the clean coffee inside.

If desired, a fan or blower may be connected with one end of the cylinder for creating a draught or current through the same.

After the coffee is thoroughly cleaned by the above operation I pour into the cylinder a solution of gum arabic in water, and again turn the cylinder until the solution forms a glossy coating on the beans of coffee. This coating serves both to protect the coffee and to give it a fine appearance.

Having thus described my invention, what I claim is—

The process herein described of polishing coffee by means of the revolving drum and gum arabic, applied as set forth.

GEORGE WHITNEY HUNGERFORD.

Witnesses:
   WM. H. LOTZ,
   G. LOTZ. (111.)